(12) United States Patent
Gaw et al.

(10) Patent No.: US 9,189,528 B1
(45) Date of Patent: Nov. 17, 2015

(54) SEARCHING AND TAGGING MEDIA STORAGE WITH A KNOWLEDGE DATABASE

(71) Applicant: Google Inc., Mountain View, CA (US)

(72) Inventors: Shirley Gaw, Paris (FR); Vladimir Vuskovic, Zollikerberg (CH); Raul Marian Fumica, Zurich (CH)

(73) Assignee: Google Inc., Mountain View, CA (US)

( * ) Notice: Subject to any disclaimer, the term of this patent is extended or adjusted under 35 U.S.C. 154(b) by 256 days.

(21) Appl. No.: 13/835,116

(22) Filed: Mar. 15, 2013

(51) Int. Cl.
  *G06F 17/30* (2006.01)
(52) U.S. Cl.
  CPC .................................. *G06F 17/30554* (2013.01)
(58) Field of Classification Search
  CPC .............................................. G06F 17/30554
  USPC ......... 707/707, 711, 722, 737, 736, 752, 754, 707/913
  See application file for complete search history.

(56) References Cited

U.S. PATENT DOCUMENTS

| | | | |
|---|---|---|---|
| 6,983,287 B1* | 1/2006 | Jayanti et al. | 1/1 |
| 7,966,225 B2* | 6/2011 | Chan et al. | 707/737 |
| 8,145,648 B2 | 3/2012 | Kunjithapatham et al. | |
| 2009/0326947 A1 | 12/2009 | Arnold et al. | |
| 2010/0274667 A1 | 10/2010 | Lanham et al. | |
| 2011/0040767 A1 | 2/2011 | Kunjithapatham et al. | |
| 2012/0254917 A1 | 10/2012 | Burkitt et al. | |

* cited by examiner

*Primary Examiner* — Marc Filipczyk
(74) *Attorney, Agent, or Firm* — Lowenstein Sandler LLP (57) ABSTRACT

A system and method for searching media storage with a knowledge database is provided. The system includes a search retrieving unit to retrieve a search request, an association retrieval unit to retrieve an association between a content item from the media storage and an identification from the knowledge database based on the search request, and an output unit to output data generated by the association retrieval unit. A method tagging a content item with a knowledge database includes determining the content item to be tagged, tagging the content item with an identification from the knowledge database, and storing the content item and the tagged identification in a tag database.

20 Claims, 5 Drawing Sheets

SEARCHING AND TAGGING MEDIA STORAGE WITH A KNOWLEDGE DATABASE

BACKGROUND

A knowledge database, such as freebase, is an online collection of structured data harvested from many sources. For example, the structured data may be sourced from a public database. Additionally, the structured data may be sourced from collaborative public contribution.

The knowledge database may employ a graph model. The knowledge data base may be populated with nodes, with each node representing a topic or subtopic. For example, if a famous actor is a topic, sub topics may be the movies the actor has been in or various other activities or attributes associated with the actor.

The nodes, which may be assigned to each topic or subtopic may interrelate to each other, thereby creating a graphical three dimensional representation of all the data associated with the knowledge database.

Each node may have an associated identification. The identification may be represented by a string used to identify any node in the graph. For example, a node for the president of the United States may be represented by '/en/president_of_the_USA'. Each topic may be associated with several different identifications.

Media storage may be served to the general public through video, music or text sharing web sites. Thus, a media sharing web site may contain media sourced from publishers or created by the various users of the media sharing web site. The media sharing web site may be employed with an application programming interface (API), thereby allowing parties to script command based languages to access and manipulate the media sourced from the media sharing web site.

Further, a media sharing web site may employ a tag functionality associated with each content item. A tag is a non-hierarchical keyword or term assigned to a piece of information (such as an Internet bookmark, digital image, or computer file). Tags are generally chosen informally and personally by the content item's creator or by its viewer, depending on the implementation associated with the media sharing web site.

SUMMARY

A system and method for searching media storage with a knowledge database is provided. The system includes a search retrieving unit to retrieve a search request, an association retrieval unit to retrieve an association between a content item from the media storage and an identification from the knowledge database based on the search request, and an output unit to output data generated by the association retrieval unit. A method tagging a content item with a knowledge database includes determining the content item to be tagged, tagging the content item with an identification from the knowledge database, and storing the content item and the tagged identification in a tag database.

DESCRIPTION OF THE DRAWINGS

The detailed description refers to the following drawings, in which like numerals refer to like items, and in which.

DETAILED DESCRIPTION

Content associated with a media sharing web site may be searchable. However, a search of a keyword that is cross referenced to meta data, a description or a title associated with the media sharing web site may be limited in the effectiveness of delivering relevant content to a searching user. This limitation may be due to the meta data, description or title not fully describing the content.

A knowledge database may be cross-referenced with content from the media sharing web site. Thus, content such as individual media items, playlists of a plurality of media items, or a user-created channel of content may be associated with identifications from the knowledge database.

A database cross-referencing identifications from the knowledge database may populate the database employing various techniques. The populating of the database may be facilitated by matching aspects associated with the content item, such a title, description or meta data with the string associated with the identification from the knowledge database. Thus, each content item may be associated with one or more identifications from the knowledge database.

The methods and systems disclosed herein allow for the searching of the media sharing web site with identifications from the knowledge database. A user may search the media sharing web site using the identifications from the knowledge database. Alternatively, a script employing an API to search content items from the media sharing web site may use identifications from the knowledge database.

In addition to retrieving content items, the methods and systems disclosed herein may also retrieve pertinent identifications from the knowledge database. A pertinent identification may be an identification associated with the retrieved content item. Thus, a user may be cognizant of additional identifications from the knowledge database that may be relevant to the user's initial search.

Further, the media sharing web site may employ the identifications from the knowledge database to populate tags for each content item. Thus, by populating tags using the identifications from the knowledge database, the process of tagging becomes automatic and not hindered by errors introduced through manual user based tagging.

Figure 1:
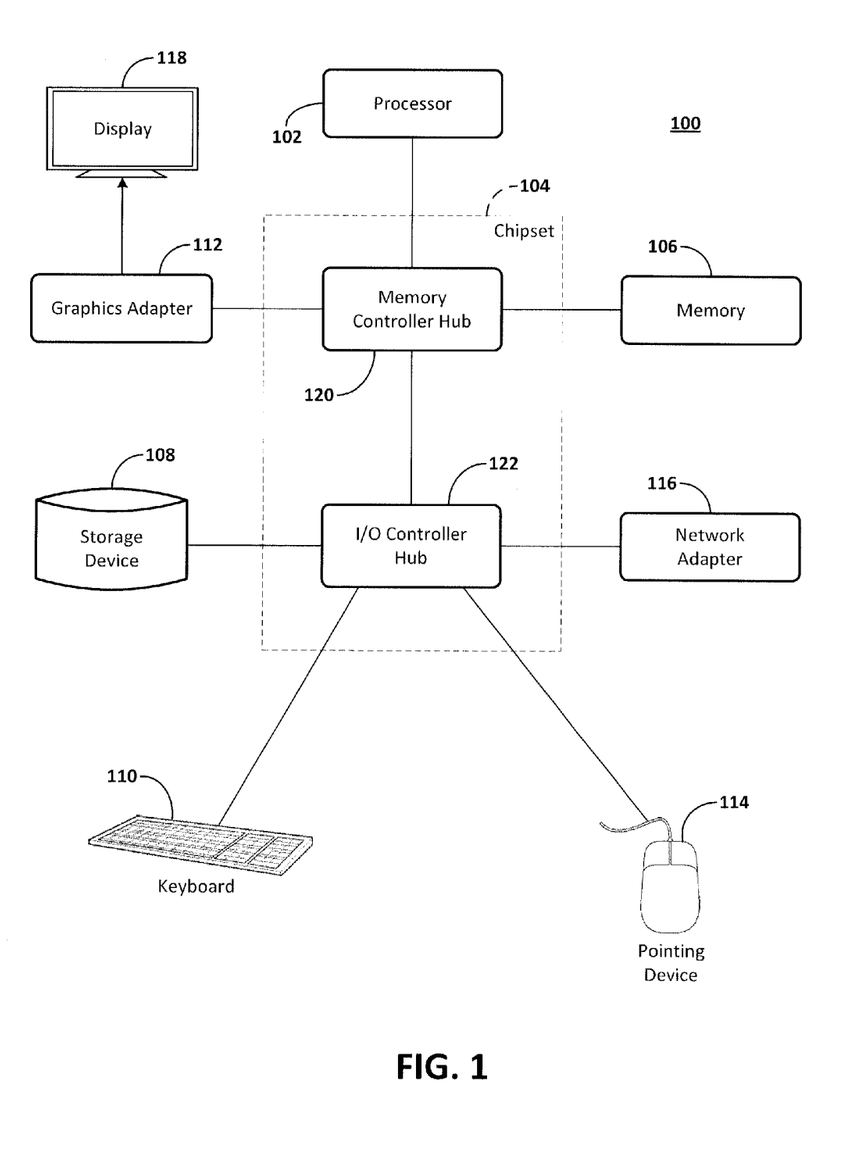
FIG. 1 is a block diagram illustrating an example computer.

FIG. 1 is a block diagram illustrating an example computer 100. The computer 100 includes at least one processor 102 coupled to a chipset 104. The chipset 104 includes a memory controller hub 120 and an input/output (I/O) controller hub 122. A memory 106 and a graphics adapter 112 are coupled to the memory controller hub 120, and a display 118 is coupled to the graphics adapter 112. A storage device 108, keyboard 110, pointing device 114, and network adapter 116 are coupled to the I/O controller hub 122. Other embodiments of the computer 100 may have different architectures.

The storage device 108 is a non-transitory computer-readable storage medium such as a hard drive, compact disk read-only memory (CD-ROM), DVD, or a solid-state memory device. The memory 106 holds instructions and data used by the processor 102. The pointing device 114 is a mouse, track ball, or other type of pointing device, and is used in combination with the keyboard 110 to input data into the computer system 100. The graphics adapter 112 displays images and other information on the display 118. The network adapter 116 couples the computer system 100 to one or more computer networks.

The computer 100 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 108, loaded into the memory 106, and executed by the processor 102.

The types of computers used by the entities and processes disclosed herein can vary depending upon the embodiment and the processing power required by the entity. For example, a data store, such as a hard disk, solid state memory or storage device, might be stored in a distributed database system comprising multiple blade servers working together to provide the functionality described herein. The computers can lack some of the components described above, such as keyboards 110, graphics adapters 112, and displays 118.

Figure 2:
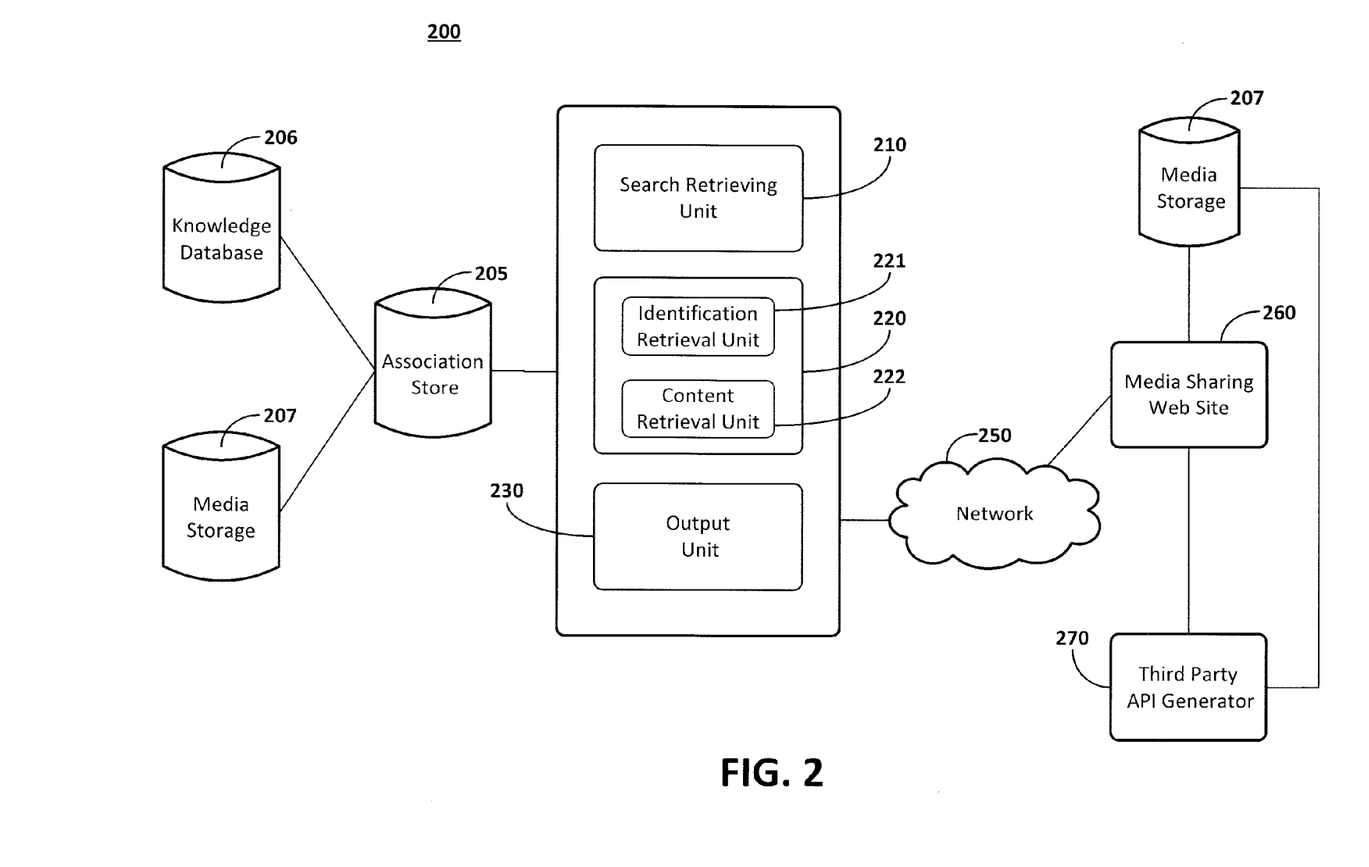
FIG. 2 illustrates an example of a system for searching media storage with a knowledge database.

FIG. 2 illustrates an example of a system 200 for searching media storage with a knowledge database. System 200 includes a search retrieving unit 210, an association retrieval unit 220, and an output unit 230. The system 200 may be implemented on a computer 100. The system 200 may communicate locally or via network 250, to an association store 205, knowledge database 206, and media storage 207. The association store 205, knowledge database 206 and media storage 207 may be a data storage device, such as the devices enumerated in describing data store 108. In FIG. 2, one knowledge base is shown; however, the aspects disclosed herein may be incorporated with multiple knowledge bases.

The system 200 may communicate data to various receiving parties via network 250. For example, system 200 may communicate to a media sharing web site 260 and an API generator 270. The video sharing web site 260 is equipped with the capabilities of receiving API commands from sources, such as the API generator 270.

The search retrieving unit 210 retrieves a search request. The search request may be an identification from the knowledge database 206. Further, the search request may be any sort of keyword search for content from the media storage 207. The search request may be sourced from a script using an API associated with a media sharing web site 260, or from a user entering a search term in a toolbar. Further, the search request may be a specific content item.

The association retrieval unit 220 includes an identification retrieval unit 221, and a content retrieval unit 222. A user or requesting source may indicate the preferred retrieved items based on a predefined setting.

The identification retrieval unit 221 uses the search requested by the search retrieving unit 210 and accesses the association store 205 to determine if any identifications from the knowledge database 206 are retrieved. Thus, if the search request is or leads to the retrieval of any content items, the identification retrieval unit 221 may retrieve identifications from the knowledge database 206 associated with the retrieved content items.

The search request to retrieve identifications from the knowledge database 206 may be a keyword, a content item, or an identification from the knowledge database 206. For example, if the search request is an identification from the knowledge database 206, a content item associated with the search request may be retrieved, and subsequently other identifications from the knowledge database 206 may also be retrieved. In this way, a searcher is made cognizant of other identifications that may be pertinent to the content that the searcher is interested in.

The content retrieval unit 222 uses the search requested by the search retrieving unit 210, and retrieves content items relevant to the search request from the media storage 207 based, in part, on the associations stored in the association store 205. For example, if the search request is an identification from the knowledge database 206, content items associated with the search request may be retrieved.

The output unit 230 may communicate the retrieved content items or identifications from the knowledge database 206 to a receiving party. The output unit 230 may communicate via a network 250, such as the Internet, to the receiving party. The receiving party may be a media sharing web site 260 or an API generator 270. In either case, the receiving party may determine a next action associated with the retrieved content items, such as displaying the content item for a user, or performing another search based on the retrieved identifications.

Figure 3:
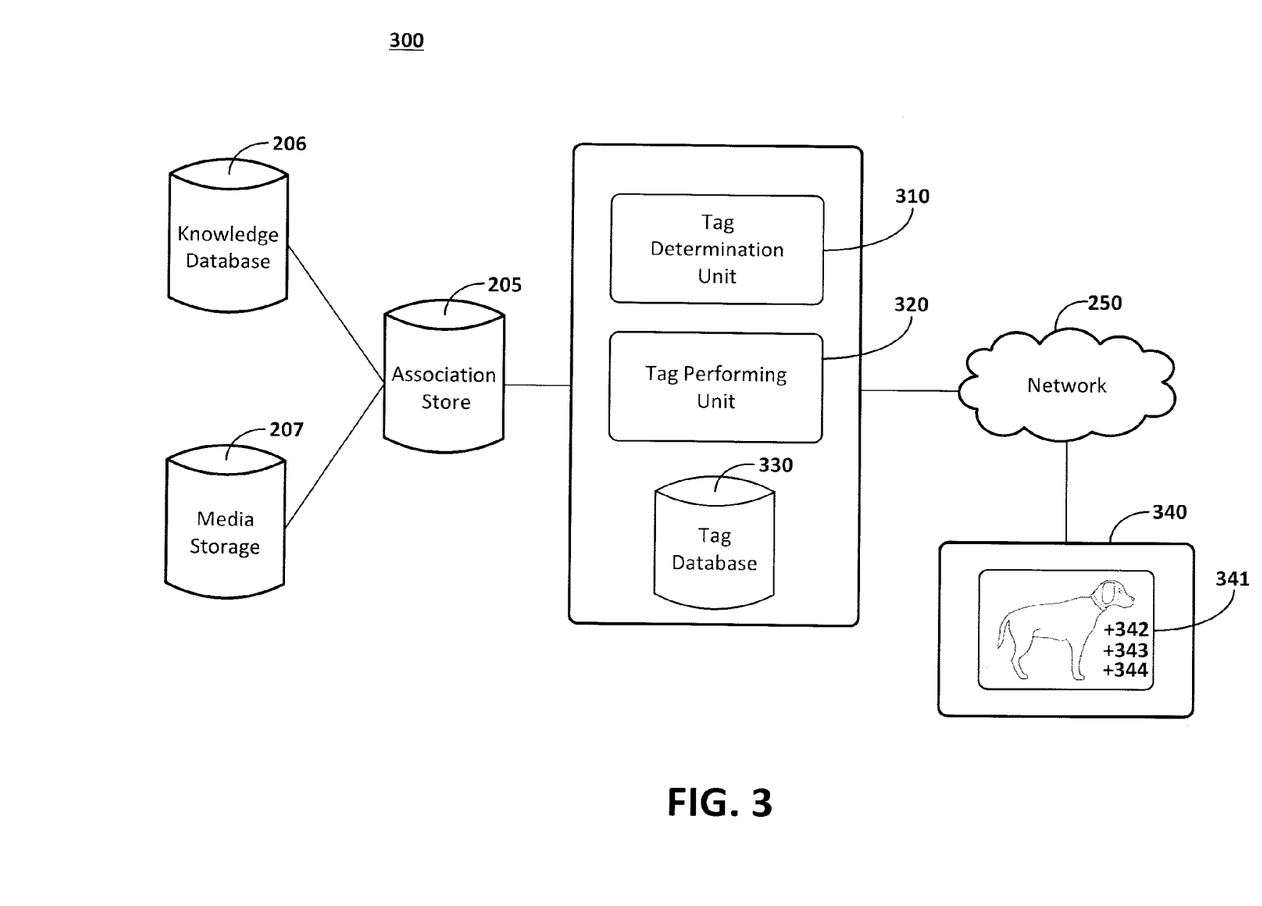
FIG. 3 illustrates an example of a system for tagging media storage with a knowledge database.

FIG. 3 illustrates an example of a system 300 for tagging media storage with a knowledge database. System 300 may include a tag determination unit 310, a tag performing unit 320, and a tag database 330. The system 300 may be implemented on a computer 100. The system 300 may communicate, locally or via network 250, to an association store 205, knowledge database 206, and media storage 207.

The system 300 may communicate data to various receiving parties via network 250. For example, system 300 may communicate to a media sharing web site 340.

The tag determination unit 310 retrieves content items from the media storage 207 based on a predetermined condition. For example, an implementer of system 300 may ascertain that content items related to dogs are retrieved. The retrieval may be performed using various heuristics, such as content items with a certain view count, content items associated with a specific identification from the knowledge database 206, for example.

The tag performing unit 320, based on the retrieved content items, tags the retrieved content items based on the identifications from the knowledge database 206 associated with the content item. The association may be ascertained from the associate store 205.

The tag database 330 stores information about the tag performed by the tag performing unit 320. The tag database 330 may be in communication, via network 250, with a media sharing web site 340.

As shown in FIG. 3, the media sharing web site 340 displays a content item 341 (such as a content item retrieved from the media storage 207). The media sharing web site 340 may also display tag items 342, 343 and 344. The tag items are sourced from identifications from the content item 341. The tagging of content item 341 is performed by the tag performing unit 320, and the information about the tagging is retrieved from the tag database 330.

For example, if the content item 341 is a famous dog: tag item 342 may be 'dog', tag item 343 may be 'golden retriever'. and tag item 344 may be 'The name of the dog'.

Figure 4:
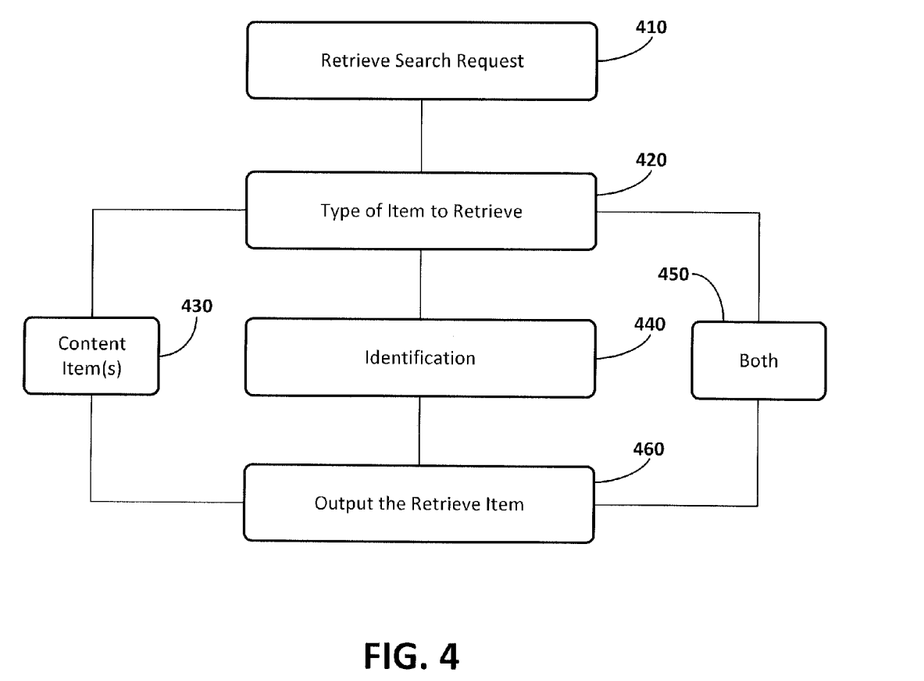
FIG. 4 illustrates an example of a method for searching media storage with a knowledge database.

FIG. 4 illustrates an example of a method 400 for searching media storage with a knowledge database. The method 400 may be implemented on a system 200.

In operation 410, a search request is retrieved. The search request may be an attribute associated with a content item, such as a keyword or a specific content item. The search request may also be an identification from a knowledge database 206.

In operation 420, a determination is made whether to retrieve content items, identifications from a knowledge database 206 or both. If a determination is made to retrieve content items, method 400 proceeds to operation 430. If a determination is made to retrieve identification from knowledge database 206, the method 400 proceeds to operation 440. If a determination is made to retrieve both, the method proceeds to operation 450.

In operation 430, if the search request is a content item, identifications from the knowledge database 206 that have been previously associated with the content item are retrieved. After retrieving, the method 400 proceeds to operation 460.

In operation 440, if the search request is an identification from the knowledge database 206, content items that have been previously associated with the identification is retrieved. After retrieving, the method 400 proceeds to operation 460.

In operation 450, if both content items and identifications from a knowledge database 206 are requested, content items may be retrieved, while identifications from a knowledge database 206 that are germane to the content items may also be retrieved. The search request in operation 450 may be a specific content item, a request for a content item, or an identification from a knowledge database 206. Thus, as long as any content items are retrieved, the associated identifications from a knowledge database 206 are also retrieved. After retrieving, the method 400 proceeds to operation 460.

In operation 460, the method outputs the retrieved content items, identifications from a knowledge database 206 or both to a designated receiving party. For example, the designated receiving party may be a media sharing web site or an API accessing the media sharing web site.

Figure 5:
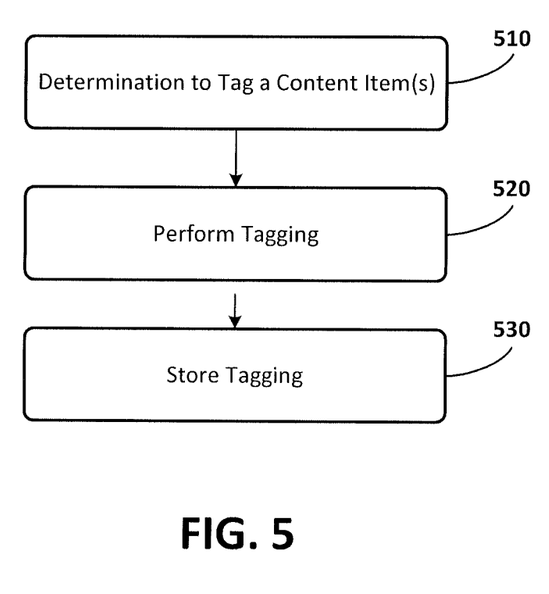
FIG. 5 illustrates an example of a method for tagging media storage with a knowledge database.

FIG. 5 illustrates an example of a method 500 for tagging media storage with a knowledge database. The method 500 may be implemented on a system 300.

In operation 510, a determination to tag a content item or group of content items is made. The implementer of method 500 may determine any sort of heuristic to select the content item or the group of content items. For example, the group of content items may be selected based on content items that satisfy a condition or are related to a topic.

In operation 520, the content item or the group of content items are tagged via associated identifications from a knowledge database 206. These associations may be obtained from a previously performed operation (such as the operation that populates association store 205).

In operation 530, the content items along with the tags from operation 520 are stored in a persistent store, such as tag database 330. In operation 540, the content item or content items may be transmitted to an external party, such as a media sharing web site or a source implementing an API associated with the media sharing web site.

Certain of the devices shown in FIG. 1 include a computing system. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAMs) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to a number of flow charts and accompanying descriptions to illustrate the embodiments represented in FIGS. 3 and 4. The disclosed devices, components, and systems contemplate using or implementing any suitable technique for performing the steps illustrated in these figures. Thus, FIGS. 3 and 4 are for illustration purposes only and the described or similar steps may be performed at any appropriate time, including concurrently, individually, or in combination. In addition, many of the steps in these flow charts may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on a tangible computer storage medium for execution by one or more processors. A computer storage medium can be, or can be included in, a computer-readable storage device, a computer-readable storage substrate, or a random or serial access memory. The computer storage medium can also be, or can be included in, one or more separate tangible components or media such as multiple CDs, disks, or other storage devices. The computer storage medium does not include a transitory signal.

As used herein, the term processor encompasses all kinds of apparatus, devices, and machines for processing data, including by way of example a programmable processor, a computer, a system on a chip, or multiple ones, or combinations, of the foregoing. The processor can include special purpose logic circuitry, e.g., an FPGA (field programmable gate array) or an ASIC (application-specific integrated circuit). The processor also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, module, engine, software, software application, script, or code) can be written in any form of programming language, including compiled or interpreted languages, declarative or procedural languages, and the program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

To provide for interaction with an individual, the herein disclosed embodiments can be implemented using an interactive display, such as a graphical user interface (GUI). Such GUI's may include interactive features such as pop-up or pull-down menus or lists, selection tabs, scannable features, and other features that can receive human inputs.

The computing system disclosed herein can include clients and servers. A client and server are generally remote from each other and typically interact through a communications network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

We claim:

1. A system, comprising:
    a processor; and
    a memory communicatively coupled to the processor, the memory having stored therein computer-executable instructions, comprising:
        a knowledge database comprising nodes on a variety of topics from a variety of sources, wherein each node comprises structured data on a topic, the structured data comprises at least one textual identification string associated with the topic;
        a media storage component comprising a plurality of content items, where each content item comprises metadata at least partially populated by a creator or viewer of the content item;
        an association store component configured to generate and store associations between the content items and the textual identification strings based upon the metadata and the textual identification strings meeting at least one matching criteria;
        a search retrieving unit configured to retrieve a search request;
        an association retrieval unit configured to retrieve an association between a content item from the media storage component and at least one textual identification string from the knowledge database based on the search request matching at least one of metadata associated with the content item or the at least one textual identification string from the knowledge database; and
        an output unit configured to display the content item and the at least one textual identification string from the knowledge database in response to the search request.

2. The system according to claim 1, wherein the search request comprises at least a portion of a first textual identification string of the at least one textual identification string from the knowledge database.

3. The system according to claim 2, wherein the association retrieval unit retrieves the content item based on at least the portion of the first textual identification string from the knowledge database.

4. The system according to claim 3, wherein the association retrieval unit retrieves a second textual identification string of the at least one textual identification string from the knowledge database based on the retrieved content item.

5. The system according to claim 1, wherein the search request comprises metadata from the content item.

6. The system according to claim 5, wherein the association retrieval unit retrieves the at least one textual identification string based on the content item identified from the metadata.

7. The system according to claim 1, wherein the output unit communicates the display of the content item and the at least one textual identification string from the knowledge database to a media sharing web site.

8. The system according to claim 1, wherein the search request is generated by an application program interface (API).

9. The system according to claim 1, wherein the content item is a video, a group of videos, or a channel associated with a user of the media sharing web site.

10. A method, comprising:
    accessing, by a system comprising a processor, a knowledge database comprising nodes on a variety of topics from a variety of sources, wherein each node comprises structured data on a topic, the structured data comprises at least one textual identification string associated with the topic;
    accessing, by the system, a media storage comprising a plurality of content items, where each content item comprises metadata at least partially populated by a creator or viewer of the content item;
    generating and storing, by the system, associations between the content items and the textual identification strings based upon the metadata and the textual identification strings meeting at least one matching criteria;
    retrieving, by the system, a search request;
    identifying, by the system, an association between a content item from the media storage and at least one textual identification string from the knowledge database based on the search request matching at least one of metadata associated with the content item or the at least one textual identification string from the knowledge database; and
    presenting, by the system, the content item and the at least one textual identification string from the knowledge database to a receiving party in response to the search request.

11. The method of claim 10, wherein the search request comprises at least a portion of a first textual identification string of the at least one textual identification string from the knowledge database.

12. The method of claim 11, wherein the identifying comprises retrieving the content item based on at least the portion of the first textual identification string from the knowledge database.

13. The method of claim 12, wherein the identifying comprises retrieving a second textual identification string of the at least one textual identification string from the knowledge database based on the retrieved content item.

14. The method of claim 10, wherein the search request comprises metadata from the content item.

15. The method of claim 14, wherein the identifying comprises retrieving the at least one textual identification string from the knowledge database based on the content item identified from the metadata.

16. The method of claim 10, wherein the receiving party is a media sharing web site.

17. A non-transitory computer-readable medium having instructions stored thereon that, in response to execution, cause a system including a processor to perform operations comprising:
   accessing a knowledge database comprising nodes on a variety of topics from a variety of sources, wherein each node comprises structured data on a topic, the structured data comprises at least one textual identification string associated with the topic;
   accessing a media storage comprising a plurality of content items, where each content item comprises metadata at least partially populated by a creator or viewer of the content item;
   generating and storing associations between the content items and the textual identification strings based upon the metadata and the textual identification strings meeting at least one matching criteria;
   retrieving a search request;
   identifying an association between a content item from the media storage and at least one textual identification string from the knowledge database based on the search request matching at least one of metadata associated with the content item or the at least one textual identification string from the knowledge database; and
   presenting the content item and the at least one textual identification string from the knowledge database to a receiving party in response to the search request.

18. The non-transitory computer-readable medium of claim 17, wherein the search request comprises at least a portion of a first textual identification string of the at least one textual identification string from the knowledge database.

19. The non-transitory computer-readable medium of claim 18, wherein the identifying comprises retrieving the content item based on at least the portion of the first textual identification string from the knowledge database.

20. The non-transitory computer-readable medium of claim 19, wherein the identifying comprises retrieving a second textual identification string of the at least one textual identification string from the knowledge database based on the retrieved content item.

* * * * *